United States Patent [19]

See

[11] Patent Number: 5,579,108
[45] Date of Patent: Nov. 26, 1996

[54] SYSTEM AND METHOD FOR DETECTING THE ANGLE OF A LIGHT BEAM USING A MASK WITH A TRANSMISSIVITY PATTERN

[75] Inventor: Chung W. See, Leicester, Great Britain

[73] Assignee: Rank Taylor Hobson Limited, United Kingdom

[21] Appl. No.: 318,762

[22] PCT Filed: Apr. 15, 1993

[86] PCT No.: PCT/GB93/00790

§ 371 Date: Oct. 14, 1994

§ 102(e) Date: Oct. 14, 1994

[87] PCT Pub. No.: WO93/21496

PCT Pub. Date: Oct. 28, 1993

[30] Foreign Application Priority Data

Apr. 16, 1992 [GB] United Kingdom .................. 9208412

[51] Int. Cl.$^6$ ..................................................... G01B 9/02
[52] U.S. Cl. ........................................... 356/345; 356/363
[58] Field of Search ................................. 356/345, 363, 356/358

[56] References Cited

U.S. PATENT DOCUMENTS

| | | |
|---|---|---|
| H746 | 2/1990 | Leach . |
| 3,435,246 | 3/1969 | Webb . |
| 4,586,821 | 5/1986 | Chandra et al. .......................... 356/363 |
| 4,662,750 | 5/1987 | Barger ..................................... 356/345 |
| 4,887,905 | 12/1989 | Lisson et al. ............................ 356/363 |
| 5,046,843 | 9/1991 | Keren . |

FOREIGN PATENT DOCUMENTS

| | | |
|---|---|---|
| 0220046 | 4/1987 | European Pat. Off. . |
| 0405462 | 1/1991 | European Pat. Off. . |
| 4204857 | 8/1992 | Germany . |
| 1307431 | 2/1973 | United Kingdom . |
| 2129245 | 5/1984 | United Kingdom . |
| 8900674 | 1/1989 | WIPO . |

Primary Examiner—Samuel A. Turner
Assistant Examiner—Amanda Merlino
Attorney, Agent, or Firm—Lerner, David, Littenberg, Krumholz & Mentlik

[57] ABSTRACT

A system for measuring the angle of a beam of light is arranged so that a periodically varying pattern is formed on a photodetector, with a waveform property such as wavelength or phase of the pattern varying with the angle of the light. This may be done by creating interference between the light beam to be measured and a reference light beam having a fixed angle, or by forming a shadow on the detector array of one or more masks having a periodically varying transmission characteristic. One convenient way of processing the output of the photodetector array is to perform a fast Fourier transform, obtain therefrom one or more spatial frequency components, and extract therefrom a part which provides a measure of the angle of the light beam. The use of a periodically varying pattern on the photodetector array enables a substantial length of the array to be used in any particular measurement operation, and averages out individual performance differences between different elements of the photodetector array. The use of waveform properties enables convenient signal processing to be carried out, for example using well known fast Fourier transform techniques.

11 Claims, 4 Drawing Sheets

SYSTEM AND METHOD FOR DETECTING THE ANGLE OF A LIGHT BEAM USING A MASK WITH A TRANSMISSIVITY PATTERN

The present application relates to the detection of the angle of a beam of light.

Systems for detecting the angle of a beam of light are used, for example, in devices for detecting the alignment of two parts of an apparatus or for detecting the flatness of an optical table or other table by measuring the relative alignment between different portions of the table. Similarly, they may be used for measuring the flatness of an optical slideway or of a machine bed.

In such systems, a beam of light is shone onto the surface the alignment of which is to be detected, and the angle of the reflected beam is detected. The angle of the reflected beam will provide a measure of the angle of the surface from which it is reflected. In practice, the beam is normally reflected not from the surface itself but from a mirror placed on the surface, in order to ensure a high quality specular reflection.

In a known system for measuring the angle of a light beam, a parallel-sided light beam is directed to an object and the reflected return beam is captured by a lens. The angle of the reflected return beam is determined by placing a multi-element photodetector spaced from the lens by the focal length thereof. The reflected return beam will be parallel-sided, and as is well known, a parallel-sided beam is focussed by a lens to a spot at a position one focal length from the lens, the position of the spot in the focal plane being determined by the angle of incidence of the parallel-sided beam. Accordingly, this arrangement creates a spot of light on the multi-element photodetector at a position corresponding to the angle of the reflected return beam. The position of the spot can be detected from the output of the photodetector.

While the arrangement described above is highly accurate in theory, it is in practice limited by the quality of the optical elements used, and also by the characteristics of the multi-element photodetector. If the gemoetry is set up in a theoretically perfect arrangement, the entirety of the light from the reflected return beam is focussed on to a single element. The resolution with which the system can detect the angle of the light beam will depend on the pitch of the elements in the detector. In order to provide a good quality output signal, the elements must be able to withstand the light power of the fully focussed beam, and preferably will not saturate at this light intensity. In practice, the apparatus may be set up so that the light beam is not focussed precisely to a spot on the detector, so that the illuminated area covers more than one element. The position of the brightest part of the illuminated area can be detected by comparing the intensities of the signal outputs from all of the illuminated elements. A drawback to this arrangment is that the calculation is very dependent on the quality of the photodetector elements. This system is adversely affected by the failure of any one of the photodetector elements. GB-A-2129245 proposes an arrangement in which a mask with slits allows narrow lines of radiation to fall on an array of rows of photo-sensitive detector elements. The rows extend transverse to the direction of the lines of radiation. Each element is as long as the distance between the slits of the mask and shaped so that for half its length it has a constant width and for the other half it has an exponentially decreasing width. Alternate rows are arranged to face in opposite directions, and the ratio of signal strength from rows facing one way to signal strength from rows facing the other way provides a measure of the position along the respective detector elements of respective lines of radiation. Since this position will change with the angle of incidence of the radiation, this ratio of signal strengths is also a measure of the angle of incidence.

According to an aspect of the present invention there is provided an arrangement for detecting the angle of a light beam in which a repeating waveform pattern is created on a photodetector array, such that a feature of the waveform, for example its shape, its wavelength or its phase, varies with the angle of the light beam. Accordingly, the angle of the light beam can be determined by appropriate processing of the output of the photosensor array. Because the pattern of light formed on the photosensor array is a repeating waveform, a relatively large number of photodetector elements contribute to the output, so that the accuracy of the measurement on any particular occasion is not highly dependent on the performance of a very small number of elements in the detector array.

Additionally, the large number of photodetector elements allows a greater total optical power to contribute to the output signal than in a system which focusses the beam to a spot. This allows an improved signal to noise ratio.

Preferably the pitch of the photosensor elements in the array is shorter than half the wavelength of the waveform feature being used in processing the photosensor output. More preferably the pitch is shorter than a quarter of the wavelength. This short pitch allows good sampling of the waveform property.

In order to ensure a good detection of the waveform property, it is also preferable that the detector array should be at least as long as the wavelength of the waveform feature of the pattern being used in processing the photosensor output, more preferably at least twice as long as the wavelength of the waveform and still more preferably at least four times as long.

Depending on the way in which the repeating waveform pattern is created on the photodetector array, its wavelength may vary with the angle of the light beam. In this case, the pitch of the photosensor elements should be determined with reference to the shortest wavelength of the repeating pattern arising in the range of angles of the light beam with which the arrangement is to be used, and the length of the detector array should be determined with reference to the longest wavelength of the repeating pattern arising in the range of angles of the light beam with which the arrangement is to be used. The range of angles of the light beam with which the arrangement is to be used (the measurement range of angles) may be determined by a variety of factors. For example, the construction of the arrangement may be such that if the angle of the light beam falls outside a particular range, the repeating waveform pattern may not be formed or may not fall on the detector array.

In the preferred embodiments of the present invention, the size of the detector array can be expanded up to the limit of the area in which the repeating pattern is formed, so as to increase the number of elements contributing to the output, thereby improving the quality of the output signal and further reducing the effect of variations in the performance of different detector elements.

In order to analyse the output signals from the photodetector, it may be useful to perform a Fourier transform on the output signal, for example by using a fast Fourier transform (FFT) procedure.

In one embodiment of the present invention a beam of light the angle of which is to be detected is caused to interfere with a reference beam, and the interference pattern is detected by a photodetector. The pattern of light and dark formed on the photodetector by the interference pattern will have a periodicity, and its wavelength will depend on the angle between the reference beam and the beam the angle of which is to be detected.

Alternatively, the beam the angle of which is to be detected may fall onto a photodetector array through one or more masks having a repeating pattern, for example a sinusoidal pattern of light and dark. The masks are spaced from one another, or where only one mask is used this is spaced from the detector. This spacing means that the position at which the shadow of the first mask falls on the next mask or on the detector varies with the angle of the incident light. Where two masks are used this will affect the shape of the waveform of the resulting pattern formed on the detector, and in either case a phase property of the detector output will vary with the angle at which light is incident on the arrangement.

Where only a single mask is used, this may be provided on one surface of a block of glass or similar transparent material, and the detector array (e.g. a CCD) may be formed on or bonded to an opposed surface, so as to ensure dimensional stability of the arrangement.

In processing the output of the detector array, the value is determined of a parameter which varies with the angle of the beam of light. It may be possible to go on to apply the value of this parameter to an equation which has been predetermined from a knowledge of the features of the system to calculate the angle. However, it will often be more convenient to calibrate the system by discovering the value of the parameter for light beams of known angles, thereby to form a look-up table which the system can use subsequently to determine the angle from the value of the parameter extracted from the photodetector output.

Figure 1:
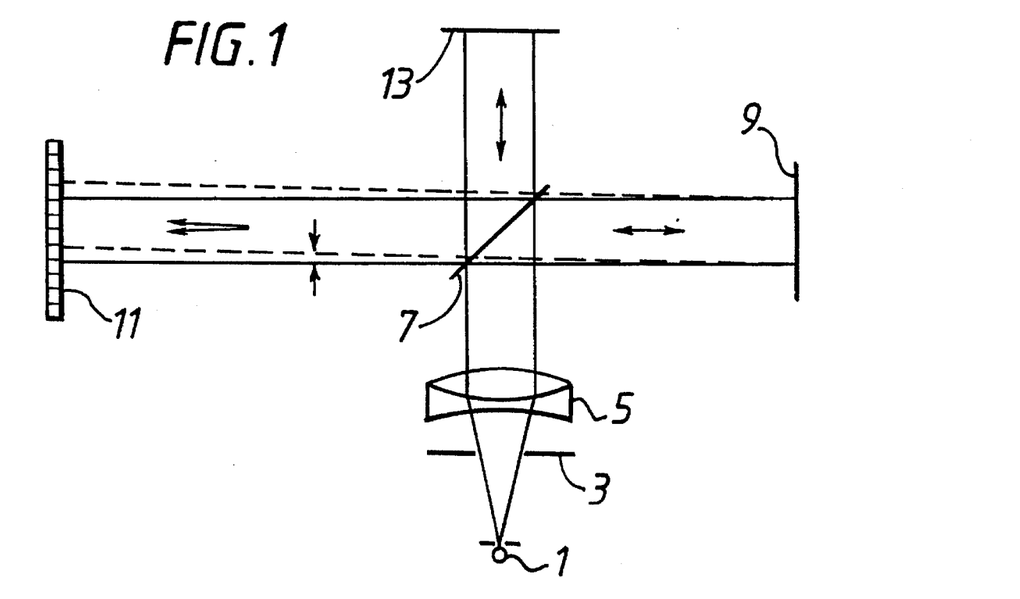
FIG. 1 shows schematically a first embodiment of the present invention.
Figure 2:
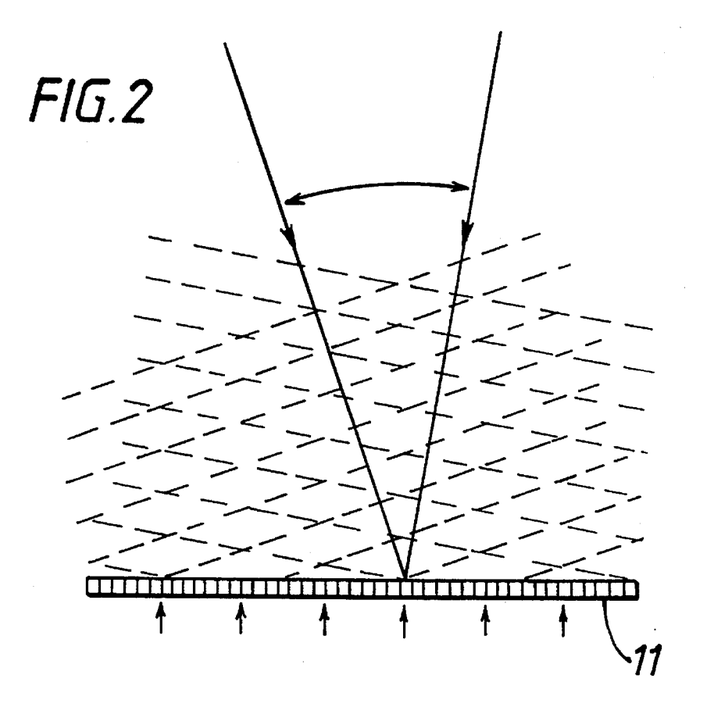
FIG. 2 shows a schematic close-up of the detector arrangement of the embodiment of FIG. 1.

Embodiments of the present invention, given by way of non-limiting example, will now be described with reference to the accompanying drawings, in which:

FIG. 1 shows schematically an arrangement of parts in a first embodiment of the present invention, and FIG. 2 is schematic enlarged view of the detector portion of the apparatus of FIG. 1.

In the arrangement of FIG. 1, light from a light source 1 passes through a stop 3 and a collimator lens 5 to fall on a beam splitter mirror 7. Part of the light is reflected by the beam splitter mirror 7 to an internal reference mirror 9, which returns it to pass through the beam splitter mirror 7 to a photodetector array 11. Typically, the photodetector array 11 is a charge-coupled device (CCD).

Light from the light source 1 which passes through the beam splitter mirror 7 passes to an external measurement mirror 13, which is mounted on a surface the alignment of which is to be measured. The light is reflected from the external measurement mirror 13 back to the beam splitter mirror 7, which reflects it to the photodetector array 11. Accordingly, two beams of light reach the photodetector array 11, one from the internal reference mirror 9 and the other from the external measurement mirror 13. By the use of coherent light, typically by providing the light source 1 as a laser, these two beams will interfere with each other. The resulting interference pattern is detected by the photodetector array 11.

Turning to FIG. 2, successive wave fronts of the two beams of light are shown in broken lines, whereas the two beam directions are shown in unbroken lines. The angle between the two beams is exaggerated as compared with FIG. 1, for the purposes of illustration.

As can be seen in FIG. 2, at the positions along the photodetector array 11 which are marked with arrows in the Figure, the light from the two light beams will interfere constructively, and accordingly the photodetector array will be illuminated brightly at these points. These points are determined by the locations at which the wave fronts in the different beams cross each other. These points are the corners in the diamond-shape pattern shown in FIG. 2. As will be appreciated, as the directions of the two beams of light become more similar, the diamond-shapes will become wider, and accordingly the points of constructive interference on the photodetector array 11 will become spaced further apart.

If the angle of the reference beam or the angle of the photodetector array 11 is altered, the separation between adjacent brightly illuminated portions on the photodetector array (i.e. the wavelength of the pattern of light and dark on it) may vary. For a given direction of the reference beam and orientation of the photodetector array 11, the wavelength of the pattern formed on the photodetector array 11 will be a measure of the angle of the measurement beam relative to the reference beam and to the photodetector array 11.

It can be seen that the pattern formed on the photodetector array 11 will be a pattern of alternating light and dark fringes, and that the wavelength of this pattern will vary with the angle between the two beams of light. As the beams of light become closer and closer to being parallel, the wavelength of the pattern on the photodetector array 11 will increase, and if the two waves are completely parallel this wavelength will be infinite. Since it becomes difficult to measure the properties of the waveform of the light and dark pattern formed on the photodetector array 11 when its wavelength becomes very long, the internal reference mirror 9 is provided so that the reflected beam from it is at a slight angle to the reflected beam from the external measurement mirror 13 when the external measurement mirror has the perfect desired alignment. In this way, a measurable output is obtained from the photodetector array 11 when the surface on which the external measurement mirror 13 is placed is correctly aligned.

Conveniently, all of the parts shown in FIG. 1 except for the external measurement mirror 13 can be provided as a unit in a common casing.

Figure 3:
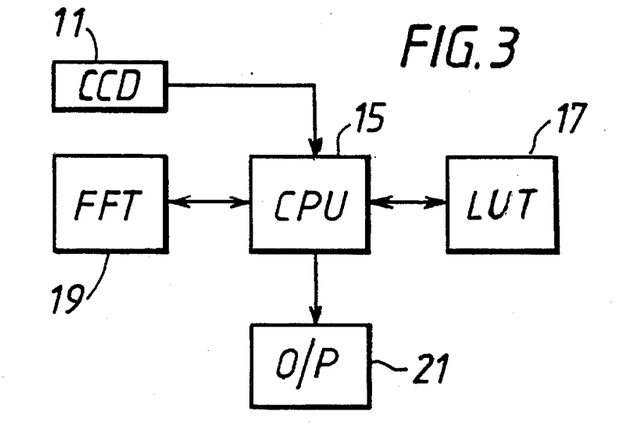
FIG. 3 shows a processing circuit for processing the output of the photodetector array.

FIG. 3 shows schematically the parts of a processing circuit for obtaining the angle of the light beam from the external measurement mirror 13 from the repeating pattern of light and dark formed on the photodetector array 11. In addition to the detector array 11, the system of FIG. 3 comprises a processing unit 15, including program and working memory, a look-up table 17, an optional fast Fourier transform unit 19, and an output device 21 such as a display or a printer for providing the output information concerning the angle of the beam from the external measurement mirror 13. The fast Fourier transform unit 19 can be provided as a software package within the program memory of the CPU 15 if desired. Fast Fourier transform units and software packages are well known.

There are a variety of ways in which the output signal from the CCD array 11 can be processed to obtain the desired angle information. In one simple method, the signal is processed by the CPU 15 in a manner which is well known, to provide a level-adjusted signal which passes above and below zero, and the points at which the signal crosses the zero level are determined. The wavelength of the pattern formed on the CCD array 11 can be obtained directly from the spacing between the zero-crossing points. As explained above, this wavelength is a measure of the angle of the external measurement mirror 13.

In an alternative method, which is presently preferred on the grounds of resolution and accuracy, the output signal from the photodetector array 11 is subjected to a fast Fourier transform by FFT unit 19, so as to be transformed into the spatial frequency domain, filtered, frequency shifted, and subjected to an inverse Fourier transform. This process can be divided into five steps, as follows.

1) Detecting interference fringes

Let $G_m$ be the gradient of the phase front of the measurement beam at the detector plane, and $G_r$ be that of the reference beam, and p the phase associated with the difference in the average optical path lengths of the two beams, the interference pattern I can be written as $$I = a(x) + b(x) \cdot \cos(2\pi(G_r x - G_m x)/\lambda + p) \quad (1)$$
$$= a(x) + b(x) \cdot \cos(2\pi f_r x - 2\pi f_m x + p)$$

where a and b are real quantities and are dependent on the intensity distribution of the light beams, $\lambda$ is the wavelength of the light, and $f_r = G_r/\lambda$, $f_m = G_m/\lambda$.

Since the light beams are not infinitely wide and will not normally have a uniform intensity across them, the beam intensity varies with distance x along the detector array 11. Therefore the values of a and b vary with x and for this reason a and b are shown as functions of x in equation (1).

Equation (1) can be rewritten as $$I = a(x) + 1/2 b(x) \cdot \exp[j2\pi(f_r - f_m)x] \exp jp \quad (2)$$
$$+ 1/2 b(x) \cdot \exp[-j2\pi(f_r - f_m)x] \exp -jp$$

where $j = \sqrt{-1}$ and "exp" means "e to the power of". The output from the CCD array 11 would be essentially as shown in equation (2).

2) Fourier transform

Taking the Fourier transform of the output of the CCD array 11 yields $$F\{I\} = F\{a(x) + 1/2 b(x) \cdot \exp[j2\pi(f_r - f_m)x] \exp jp \quad (3)$$
$$+ 1/2 b(x) \cdot \exp[-j2\pi(f_r - f_m)x] \exp -jp\}$$
$$= A(f_x) + 1/2 B(f_x - f_r + f_m) \exp jp$$
$$+ 1/2 B(f_x + f_r - f_m) \exp -jp$$

where F denotes the Fourier transform operation, A and B are the transformed functions of a and b, and $f_x$ is the spatial frequency variable. B is obtained by applying the convolution theorem of a Fourier transform and the sifting property of a Dirac-Delta function.

Graphically, equation (3) can be represented as a frequency distribution having peaks at $f_x = -(f_r - f_m)$, 0, and $+(f_r - f_m)$.

3) Filtering

This is to select either the positive or the negative parts of the spectrum and is done by multiplying equation (3) by a filter function centred at $f_x = f_r$ and with an appropriate bandwidth sufficient to include all expected values of $(f_r - f_m)$ but exclude $f_x = 0$. The resulting filtered spectrum $I_f$ is therefore $$I_f = 1/2 B(f_x - f_r + f_m) \exp jp \quad (4)$$

4) Shifting

The spatial frequency value in equation (4) is shifted by an amount equal to $f_r$ to provide a shifted spectrum $I_s$ of $$I_s = 1/2 B(f_x + f_m) \exp jp \quad (5)$$

5) Inverse Fourier Transform

Taking the inverse Fourier transform of equation (5) yields the inverse function $I_o$ $$\begin{aligned} I_o &= F^{-1}\{1/2 B(f_x + f_m) \exp jp\} \\ &= 1/2 b(x) \cdot \exp j[2\pi f_m x + p] \\ &= 1/2 b(x) \cdot \exp j[2\pi(G_m x)/\lambda + p] \end{aligned} \quad (6)$$

Since b is entirely real, the only phase term is contained in the exponential function. The tilt of the measurement beam therefore is given by the gradient $G_m$ of the linear term in the phase of the inverse Fourier transform. Note that with an FFT routine, the resultant is in the form of real and imaginary parts. The phase, and hence its linear gradient can be determined easily. The angle of the external measurement mirror 13 can be obtained from the gradient $G_m$ by reference to the geometry of the optical system.

Both in the case where the wavelength of the signal on the photodetector array 11 is extracted from zero-crossing information and in the case where the gradient of the linear term in the phase of an inverse Fourier transform signal is extracted, it is theoretically possible to derive a formula for converting the extracted signal into the angle of the external measurement mirror 13, by knowledge of the optical properties of the apparatus. However, it will normally be more convenient in practice to perform a calibration operation on the apparatus after it has been constructed, in which values of the extracted signal are determined for a variety of known angles of the external measurement mirror 13, and from this a table relating the value of the extracted signal to the angle of the mirror 13 can be constructed. Such a table is then stored as the look-up table 17, and the CPU 15 uses the look-up table 17 to obtain angle information corresponding to the extracted wavelength value or inverse Fourier transform phase signal value. The angle value thus obtained is provided to the output unit 21.

Typically, a CCD array used as the photodetector array 11 may have, for example, 2048 cells or 4096 cells, at a pitch of, for example, 10 micrometres. Thus the total length of the array will be of the order to a few centimetres. The portion of the array on which the interference pattern is formed may be very much longer than the wavelength of the interference pattern as formed on the array, so that there are many cycles of the repeating pattern formed on the array 11. Accordingly, if any individual CCD cell fails or provides a non-standard output, this has a very small effect on the reliability of the output angle measurement.

The zero-crossing signal processing method described above has a good property of resisting the effects of variations in the intensity of light across the beam. If the Fourier transform signal processing method is used, variations of light intensity across the beam may create additional terms in the initial Fourier transform output. However, provided that the intensity is uniform over a distance of the order of magnitude of the wavelength of the pattern of light and dark formed on the photodetector array 11, such components in the Fourier transform signal will easily be rejected.

In the arrangement of FIGS. 1 and 2 the component parts should be stable during the measurement operation. If, for example, there was any movement of the external measurement mirror 13 while the exposure of the photodetector array 11 was taking place, the pattern on the photodetector array 11 would move and so the pattern as detected would be blurred. In order to minimise any difficulties of this type, it is preferred to have a very fast exposure of the photodetector array 11, for example by employing a single shot laser system in the light source 1.

As has been mentioned above, the interference-based system of FIGS. 1 and 2 requires a parallel-sided beam of coherent light. Another constraint is that optical impurities, such as a speck of dust on one of the mirrors, will create interference fringes which will increase the background noise in signal read from the photodetector array 11. Accordingly, the system must be kept clean and be operated in a clean environment.

Figure 4:
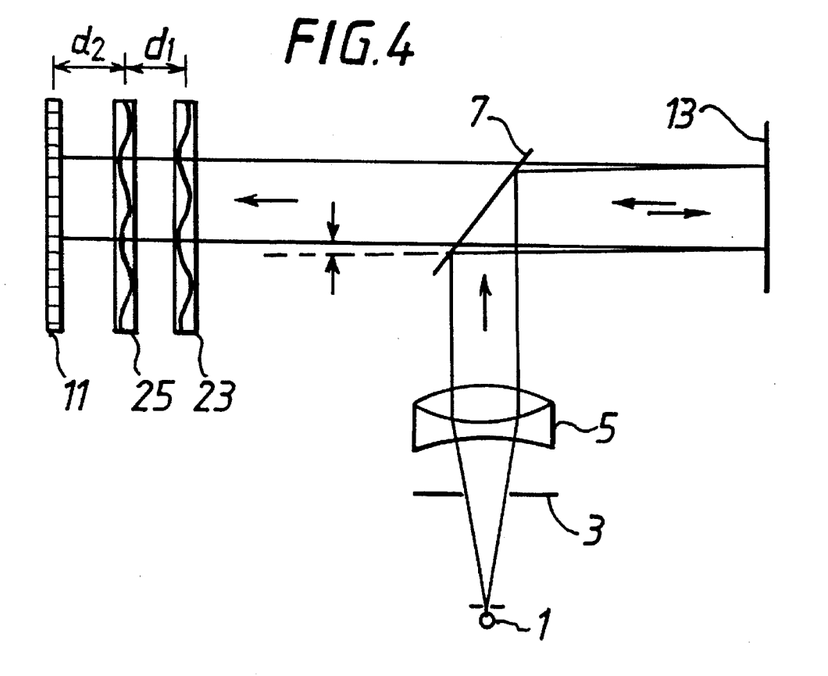
FIG. 4 is a view corresponding to FIG. 1, of a second embodiment of the present invention.
Figure 5:
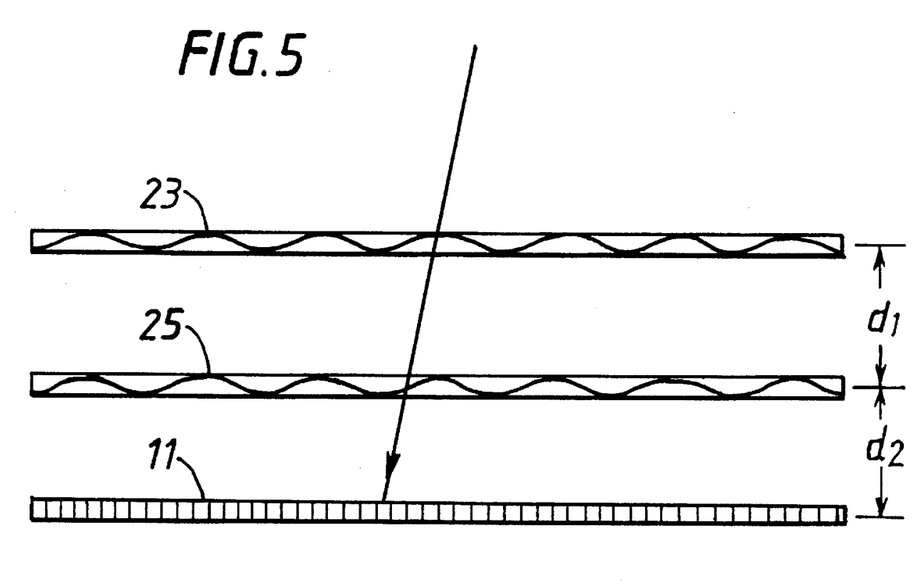
FIG. 5 is a schematic close-up view of the detector arrangement of the embodiment of FIG. 4.

FIGS. 4 and 5 are views corresponding to FIGS. 1 and 2, of a second embodiment which avoids the need to create an interference pattern.

In the arrangement of FIGS. 4 and 5, a light source 1, a stop 3, a collimator lens 5 and a beam splitter mirror 7 are provided as in FIG. 1, except that the light from the light source 1 does not need to be precisely parallel-sided nor coherent, and therefore a variety of other light sources are usable in addition to a laser.

In this system, there is no internal reference mirror, light from the light source 1 is reflected by the mirror 7 to be directed onto the external measurement mirror 13, and the light returning from the external measurement mirror 13 passes through the mirror 7 to the photodetector array 11. Mounted in front of the photodetector array 11, so that the light from the external measurement mirror 13 falls onto it, are two shadow gratings or masks 23, 25, a distance $d_1$ apart. The nearer mask 25 is a distance $d_2$ from the photodetector array 11. Each of these masks has a repeating pattern of varying light transmissivity. For example, each mask may vary between substantially entirely transparent and substantially entirely opaque in a sine wave cycle. This sine wave variation in transmissivity is indicated schematically in FIGS. 4 and 5 by the undulating line shown in each of the masks 23 and 25.

As the light reflected from the external measurement mirror 13 falls on the photodetector array 11 through the masks 23, 25, a shadow of each mask will be formed on the photodetector array 11. Each shadow will be an alternating pattern of light and dark, having a waveform and a wavelength in accordance with the mask concerned. The final pattern of light and dark actually formed on the photodetector array 11 will be a composite of the shadows from both of the masks 23, 25.

As can be seen from FIG. 5, a ray of light which passes through one particular point on the first mask 23 will pass through a point on the second mask 25 which is determined by the angle of the ray of light. In FIGS. 4 and 5 the masks are shown as having patterns of the same wavelength, and in phase with each other for light perpendicular to the masks and the photodetector array 11. The superimposition of the shadows of the two masks 23, 25 will create a pattern of light and dark on the photodetector array 11 having a formula which is the product of multiplying together the formulae of the two masks 23, 25. The masks will be multiplied together without any offset if the direction of incident light is perpendicular to the masks 23, 25 and the photodetector array 11. However, where the light is angled from the perpendicular the formulae of the masks will be multiplied together with a distance offset equal to $d_1$ tan a where a is the angle between the direction of the light and the perpendicular to the masks 23, 25, and the product will itself be offset relative to the photodetector array 11 by $d_2$ tan a. These distance offsets will represent phase offsets in the equation for the masks, according to what proportion of the wavelength L of the mask pattern is represented by each distance offset.

If the position or angle of the masks 23, 25 or the photodetector array 11 is altered, the phase offsets in the signal read from the photodetector array 11 may also alter. For a given arrangement of the masks 23, 25 and the photodetector array 11, the phase offsets in the signal read from the photodetector array 11 will be a measure of the angle of the measurement beam relative to the masks 23, 25 and the photodetector array 11. The wavelength of the pattern of light intensity formed on the photodetector array 11 is determined by the mask patterns, and does not vary with the angle of the beam of light.

If the transmissivities T1 and T2 of the masks 23, 25 are both given by:

$$T1 = T2 = 1 + \cos X \tag{7}$$

where X is the normalised distance along the masks 23, 25, (i.e. $X = 2\pi$ where the distance is one wavelength L of the mask pattern) the pattern of light S on the photodetector array 11 is given by:

$$S = T1 \times T2 = [1 + \cos(X + k_2)] \cdot \\ [1 + \cos(X + k_1 + k_2)] \tag{8}$$

where $K_1$ is the phase offset between the shadows of the patterns of the masks 23, 25 resulting from the slant of the light, and $K_2$ is the phase offset of the shadow of the pattern of the nearer mask 25 on the photodetector array 11. The phase offsets $K_1$ and $K_2$ are related to the spacings $d_1$ and $d_2$ by the formulae:

$$k_1 = (2\pi d_1 \tan a)/L \tag{9}$$

$$k_2 = (2\pi d_2 \tan a)/L \tag{10}$$

where a is the angle by which the light differs from the perpendicular to the masks 23, 25, and L is the wavelength of the transmissivity pattern of each of the masks 23, 25.

Multiplying out equation (8) gives:

$$S = 1 + \cos(X + k_2) + \cos(X + k_1 + k_2) + \cos(X + k_2) \cdot \cos(X + k_1 + k_2) \tag{11}$$

and applying trigonometric identities gives:

$$\begin{aligned} S = 1 \ & + 1/2 \cos k_1 \\ & + 2\cos(k_1/2) \cdot \cos(X + k_2 + k_1/2) \\ & + 1/2 \cos(2X + 2k_2 + k_1) \end{aligned} \tag{12}$$

It can be seen that the phase offset $k_1$ appears in the dc offset level of the output of the photodetector array 11 and the amplitude of the first harmonic (cosX) term, and both the phase offsets $k_1$ and $k_2$ appear in the phase of both the first harmonic (cosX) and the second harmonic (cos2X) terms.

If a fast Fourier transform is performed on the output of the photodetector array 11, the output will be in the form of the amplitude of the dc component and the amplitude and phase of the harmonics. Since the phase information depends on ($k_2+k_1/2$), the conversion of this into information about the angle a depends on the values of both $d_2$ and $d_1$. If the amplitudes of the dc component and the first harmonic are used, the conversion of this into information about the angle a depends only on the value of spacing $d_1$, and the precise value of $d_2$ does not matter.

As described above with reference to the first embodiment, the information obtained by Fourier transform processing is most conveniently converted into information relating to the angle of the light beam by reference to the look-up table 17, compiled by a calibration process.

As can be seen from equation (9), for any given value of the angle a, the value of $k_1$ is directly proportional to the separation $d_1$ between the two masks 23, 25. Therefore the sensitivity of the device can be increase by increasing the spacing $d_1$. However, this will also reduce the range of angles of light for which the apparatus can be used, since any value of $k_1$ outside the range $+\pi$ to $-\pi$ cannot be distinguished from a corresponding value inside this range. Accordingly the device should only be used to detect angles inside this range, unless some further arrangement is provided to distinguish between different angles resulting in the same phase offset $k_1$.

For a CCD array as previously described with reference to the first embodiment, the separation $d_1$ between the masks 23, 25 will conveniently be around 4 to 5 mm, although it can be up to about 5 cm. The separation $d_2$ between the photodetector array 11 and the closer mask 25 can conveniently be a few mm, or up to about 5 cm.

In the example described above, the patterns of the two masks 23, 25 had the same frequency and were in phase. This is not necessary, but if they have different frequencies there will be additional terms in equation (12) above. In this case, the processing circuit of FIG. 3 should identify and separate out the terms in the Fourier transform output which vary with the angle a.

For the CCD type and mask spacing given above, the wavelength of the repeating transmissivity pattern of each mask will typically be of the order of 50 μm. As a general constraint, the wavelength of the mask pattern should be greater than the pitch of 2 cells of the CCD, but does not need to be very much greater. The figure of 50 μm for the mask pattern wavelength compared with 10 μm for the CCD element pitch, so that one is five times the other, is suitable in practice.

Figure 6:
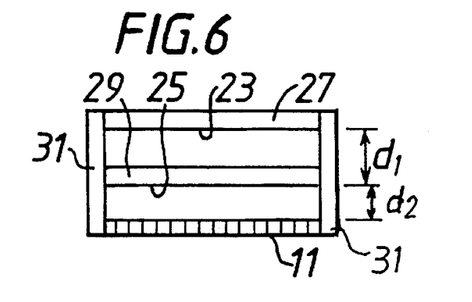
FIG. 6 shows a first physical structure for the detector assembly in the embodiment of FIGS. 4 and 5.

FIG. 6 shows one possible construction for the detector assembly of the photodetector array 11 and the masks 23, 25 in the embodiment of FIGS. 4 and 5. In FIG. 6 first and second light transmissive elements 27, 29 and the photodetector array 11 are supported and held rigidly in position by rigid side pieces 31. The transmissivity patterns forming the masks 23, 25 are formed on the surfaces of the respective light transmissive elements 27, 29, and the side pieces 31 hold the two masks 23, 25 apart from the distance $d_1$.

Some difficulty may arise with the construction of FIG. 6, owing to the need for very good mechanical stability in the detection assembly. With a CCD having 4096 cells at a 10 μm pitch, the masks being separated by a distance $d_1$ of about 5 mm and the wavelength of the mask pattern being about 50 μm, movements of the order of 10 nm in the pattern of one of the masks 23, 25 relative to the other can be detected by the method described above of determining the phase of components in the CCD output by performing a Fourier transform. Accordingly, the positioning of the two masks 23, 25 relative to each other in the longitudinal direction of the masks 23, 25 and the photodetector array 11 must be stable and non-varying to within a significantly smaller distance than this, preferably to within less than 1 nm. This is because the system cannot distinguish between changes in the angle of the light and relative movement between the two masks 23, 25. Such a very high degree of mechanical stability can be difficult to obtain with the arrangement of FIG. 6.

Figure 7:
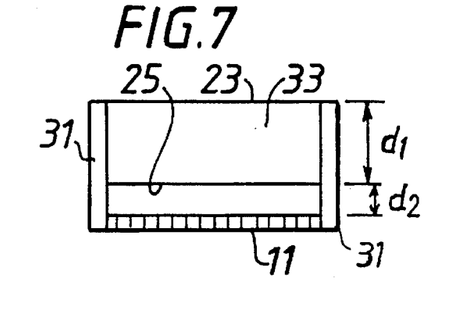
FIG. 7 shows an alternative physical construction of the detector assembly.

An alternative construction for the detector assembly is shown in FIG. 7. In this construction, a single light transmissive element 33 is provided, and the masks 23, 25 are provided by modifying the light transmissivity of respective opposed surfaces of the single light transmissive element 33. Accordingly, the distance $d_1$ between the two masks 23, 25 is defined by the thickness of the single light transmissive element 33. The side pieces 31 act to hold the single light transmissive element 33 to the photodetector array 11.

Figure 8:
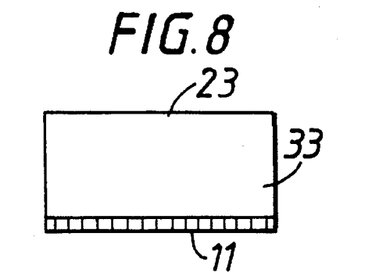
FIG. 8 shows a further alternative physical construction for the detector assembly.

The construction of the detector assembly can be further simplified and the physical stability of the assembly can be conveniently provided by the arrangement shown in FIG. 8, in which the photodetector array 11 is bonded directly to the single light transmissive element 33 or alternatively is formed directly on the single light transmissive element 33 as a substrate. The single light transmissive element 33 can be glass or any other transparent material suitable for use as a substrate in the process for forming the photodetector array 11.

In order to provide both of the masks 23, 25 using the detector assembly of FIG. 8, the second mask 25 may be provided on the surface of the single light transmissive element 33 on which the photodetector array 11 is provided. However, this may lead to complications in manufacture, and in particular it may be difficult to provide the second mask 25 if the photodetector array 11 is to be formed directly on the single light transmissive element 33 as a substrate. Accordingly, the detector assembly of FIG. 8 is more conveniently used in an embodiment of the present invention having only one variable transmissivity mask 23, which can be formed on the surface of the light transmissive element 33 remote from the photodetector array 11.

Figure 9:
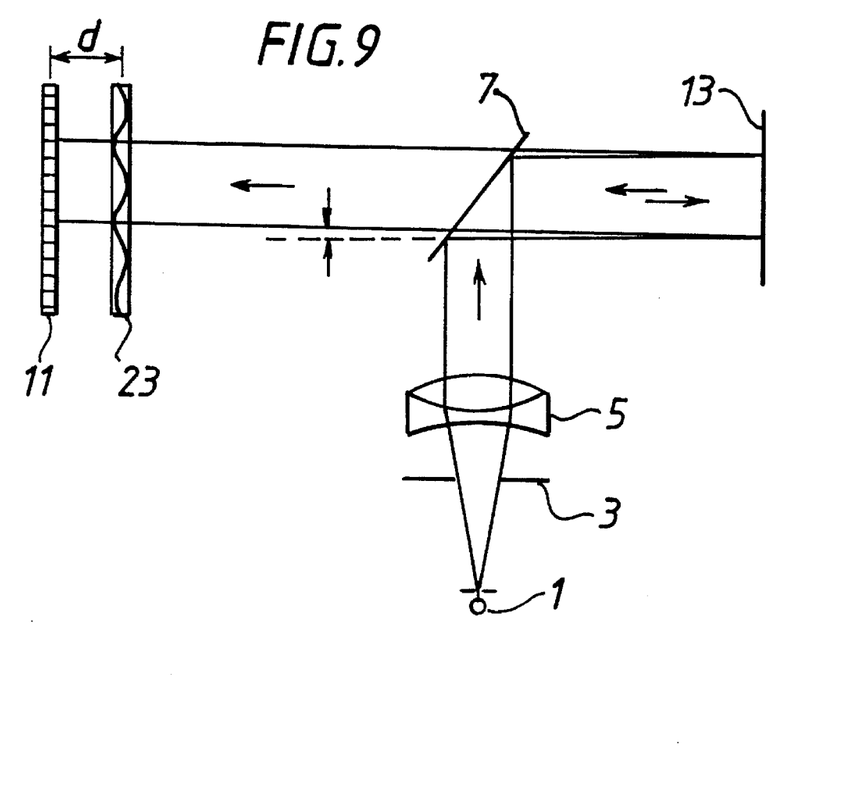
FIG. 9 is a schematic view corresponding to FIG. 1 of a third embodiment of the present invention.
Figure 10:
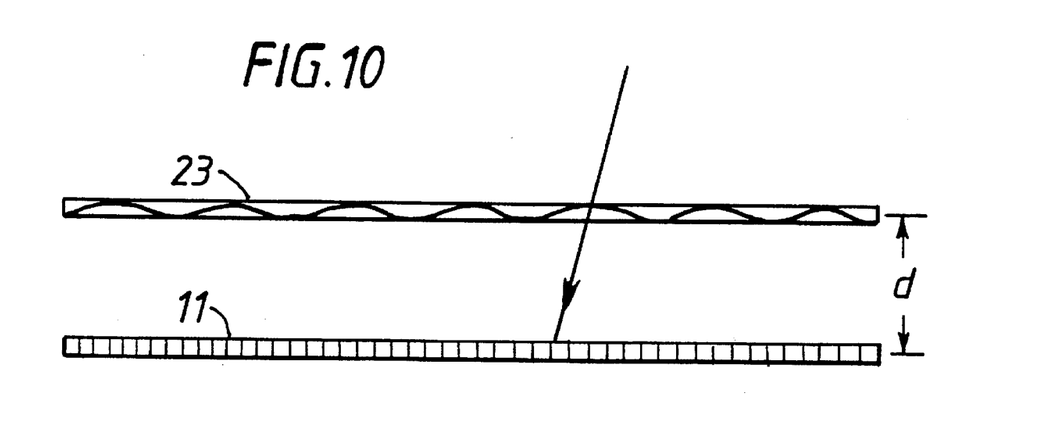
FIG. 10 is a schematic close-up view of the detector arrangement of the embodiment of FIG. 9.

FIGS. 9 and 10 illustrate a third embodiment of the present invention, in which only one variable light transmissivity mask is used.

The arrangement of FIGS. 9 and 10 is the same as the arrangement of FIGS. 4 and 5 except that only one mask 23 is present. Accordingly, the pattern of light and dark formed on the photodetector array 11 is the same repeating pattern as the pattern of the mask 23. As can be seen from FIG. 10, the position at which the shadow of any particular point on the mask 23 appears on the photodetector array 11 depends on the angle of the light reflected from the external measurement mirror 13. Accordingly the phase, with respect to the photodetector array 11, of the pattern of light and dark formed on the photodetector array 11 will vary with the angle of the light, and the processing circuit of FIG. 3 is used to determine that phase. In this case, the critical separation d is the spacing between the mask 23 and the photodetector array 11, as shown in FIGS. 9 and 10.

The phase offset of the light intensity pattern formed on the photodetector array will be a measure of the angle of the light beam relative to the mask 23 and the photodetector array 11. The wavelength of the pattern of light intensity is determined by the mask pattern, and does not vary with the angle of the light beam.

As in the embodiment of FIGS. 4 and 5, the phase offset k between the shadow pattern formed on the photodetector array 11 and the pattern of the mask 23 is defined by:

$$k = (2\pi d \tan a)/L \quad (13)$$

where L is the wavelength of the pattern of the mask 23 and a is the angle by which the light varies from being perpendicular to the mask 23 and the photodetector array 11.

If the transmissivity T of the mask 23 is given by:

$$T = 1 + \cos X \quad (14)$$

where X is distance along the mask 23 normalised with reference to L, the pattern S of light on the photodetector array is given by:

$$S = 1 + \cos(X + k) \quad (15)$$

where k is the phase offset.

One possible way of determining k is to form the Fourier transform of S, using the fast Fourier transform unit 19, and select a component having the frequency of the mask pattern. The phase term of this component will contain k.

It may be noted that since the spatial frequency of the desired harmonics are known in advance, it is not necessary to compute the Fourier transform for all the spatial frequency values but only for those which are wanted, although in this case certain values for the wavelength of the sinusoidal mask pattern will be preferable. In the embodiment of FIG. 9, only the component having the spatial frequency of the mask pattern is needed, and therefore it may be possible to obtain the desired phase information from only a single integration operation. This would reduce the processing time required, and could also enable simplified hardware, as compared with a system which computed the full fast Fourier transform.

In an alternative method, the output of the photodetector array 11 may be multiplied in the CPU 15 by cosX and separately by sinX as follows. Multiplying by cosX gives:

$$\begin{aligned} S \cos X &= \cos X \left[1 + \cos(X + k)\right] \quad (16)\\ &= \cos X + \cos X \cdot \cos(X + k) \\ &= \cos x + \tfrac{1}{2}\cos(2X + k) + \tfrac{1}{2}\cos k \quad (17) \end{aligned}$$

while multiplying by sinX gives:

$$\begin{aligned} S \sin X &= \sin X \left[1 + \cos(X + k)\right] \quad (18)\\ &= \sin X + \sin X \cdot \cos(X + k) \\ &= \sin X + \tfrac{1}{2}\sin(2X + k) - \tfrac{1}{2}\sin k \quad (19) \end{aligned}$$

It can be seen from equations (17) and (19) that if the results of multiplying the output of the photodetector array 11 by cosX and by sinX are each filtered to remove the varying terms and retain only the dc term, values can be obtained for cosk and sink. The ratio of these will provide tank. The CPU 15 can be provided with a table of tan values to enable it to determine the value of k from tank, or alternatively the look-up table 17 can be configured so that values of tank can be input to it directly. This method may require more computing power than the method using a Fourier transform.

If a CCD array of 2048 elements having an element pitch of 13 μm is used as the photodetector array 11, the wavelength of the pattern on the mask 23 is 52 μm and the spacing d between the mask 23 and the photodetector array 11 is 4 cm, the applicants estimate that tilt angles of the external measurement mirror 13 can be measured with an uncertainty, owing to theoretical considerations of photon noise, of the order of 0.005 seconds of arc.

As with the embodiment of FIGS. 4 and 5, the accuracy can be increased by increasing the separation d. However, even if the physical stability of the detector system is ensured, there is a limit to the extent to which the spacing d can be increased. If the other parameters of the system are as set out above, spacings d of more than about 10 cm will result in a significant amount of noise appearing in the output signal from the photodetector 11, caused by the diffraction grating effect of the mask 23.

As with the embodiment of FIGS. 4 and 5, the maximum available range of measurement is limited because a shift of the pattern on the photodetector array 11 by more than L/2 (where L is the wavelength of the pattern of the mask 23) cannot be distinguished from a shift falling within that range caused by a different angle of the light beam. This is not necessarily a problem, since systems of this type are normally only used for measuring very small deviations from the desired direction, and if the external measurement mirror 13 is tilted away from its desired direction by a large angle, the reflected beam may miss the detector assembly entirely. However, if it is desired to increase the measurement range of the system, means can be provided to enable successive cycles in the value of k to be resolved.

One way of providing such an arrangement is to modify the transmission characteristics of the mask 23 to superimpose a further sine wave pattern of light and dark on it, having a much longer wavelength than the pattern used for accurate angle measurement. In this case, the transmission function T of the mask 23 is given by:

$$T = 1 + \cos X + \cos(X/N) \quad (20)$$

where N is the factor by which the wavelength of the additional pattern is greater than the wavelength of the pattern used for accurate angle measurement.

If a Fourier transform method of detecting phase shift is used, the components provided by the respective superimposed sine patterns can easily be distinguished from each other, as they will have substantially different frequencies. The phase offset for the long frequency pattern will provide an unambiguous approximate measurement of the angle, while the phase offset of the short wavelength pattern will provide a more accurate measurement of the approximately determined angle.

Using the parameters for the system as set out above, the applicants estimate that in the absence of an additional longer wave pattern in the mask 23, the system can be used to measure tilt of the external measurement mirror 13 in the range + or − 67 seconds of arc, but if a further pattern is provided in the mask 23, having a wavelength of 1.644 mm, the maximum measurement range can be increased to + or − 2100 seconds of arc in the tilt of the external measurement mirror 13. This is accompanied by a slight increase in the uncertainty of the measurement, of the order of about $\overline{2}$.

In the embodiments of FIGS. 4 and 5 and FIGS. 9 and 10, the light from the light source 1 does not need to be coherent and the beam of light obtained from it does not need to be precisely parallel-sided. The intensity distribution of light across the beam does not need to be uniform, although it should be reasonably uniform over distances of the order of magnitude of the transmissivity pattern of the mask or masks 23, 25 used.

The systems described above are one-dimensional systems, in the sense that they detect the angle of tilt of the received beam of light, and thereby the external measurement mirror 13, along one axis only. The systems can be converted into two-dimensional systems, which detect the angle of tilt along two axes, in the manner shown in FIG. 11.

Figure 11:
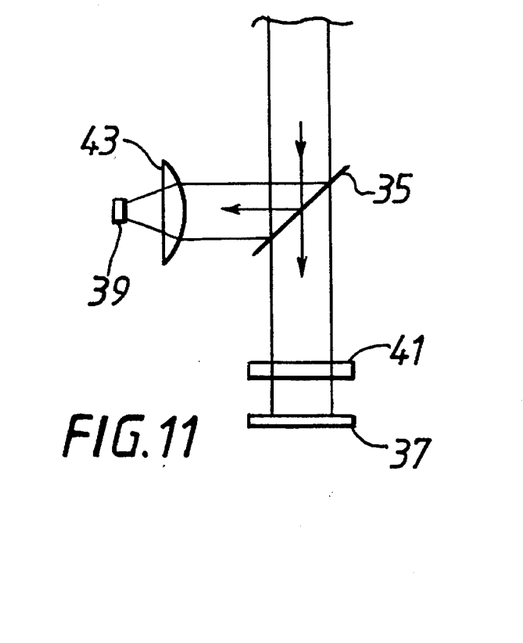
FIG. 11 shows a modification for the embodiments of FIGS. 1, 4 and 9 to enable the angle of a light beam to be detected along two mutually transverse axes.

In FIG. 11, the light leaving the beam splitter mirror 7 towards the detector falls on a second beam splitter mirror 35. Part of the light passes through the second beam splitter mirror 35 and part is reflected by it. The part which passes through the second beam splitter mirror 35 falls on a first detector assembly 37, which extends linearly in one direction, and the reflected part of the light falls on a second detector assembly 39 which extends linearly in a different direction so as to detect changes in the angle of the light along an axis generally perpendicular to the axis of change detected by the first detector assembly 37. Each of the detector assemblies 37, 39 can be as shown in FIG. 2, in FIG. 5 or in FIG. 10, depending on which of the detection arrangements is being used.

In order to provide two dimensional information, the light beam should have a cross-sectional area with a substantial extent in perpendicular directions, for example the cross-sectional shape can be generally square or generally circular. In order to concentrate this light onto the generally long, thin photodetector array 11 in each detector assembly 37, 39, respective cylindrical lenses 41, 43 are provided.

In the two-dimensional arrangement of FIG. 11, a separate processing circuit as shown in FIG. 3 can be provided for each of the detector assemblies 37, 39. Alternatively, a single common processing circuit may be used which processes the two outputs independently. This may output to the output unit 21 angles of tilt in the the two axis directions, or alternatively the CPU 15 may then combine the two angles geometrically to provide an output in the form of a magnitude of tilt and a direction of tilt.

The above embodiments have been provided by way of example, and various modifications and alternatives will be apparent to those skilled in the art.

I claim:

1. A system for detecting the angle of a light beam within a measurement range of angles, the system comprising:

photodetector means comprising an array of photodetector cells;

at least one mask having a transmissivity pattern in which transmissivity through said mask varies periodically with distance along said mask, said at least one mask being arranged so that said beam of light passes through said mask to project said transmissivity pattern onto said photodetector means to form a pattern of light on said photodetector means; and analyzing means for receiving a signal read out from the array of photodetector cells and analyzing the signal for a phase property of said pattern of light to obtain a measure of the angle of the light beam, the cells of the array being at a pitch shorter than half the shortest wavelength of said pattern of light for any angle of the light beam in the measurement range, and the array having a length longer than twice the longest wavelength of said pattern of light for any angle of the light beam in the measurement range.

2. A system according to claim 1 comprising first and second said masks, each said mask having a respective transmissivity pattern which varies periodically with distance along the respective one of said first and second masks, said first and second masks being arranged so that said beam of light passes through both of said first and second masks to project a pattern onto said photodetector means which is a composite of the respective said transmissivity patterns of said first and second masks to form said pattern of light.

3. A system according to claim 2 in which said phase property comprises the phase of said transmissivity pattern of said first mask relative to the transmissivity pattern of said second mask in said pattern of light.

4. A system according to claim 1 in which said at least one mask comprises a mask arranged so that said beam of light passes through said mask and projects said transmissivity pattern of said mask unmixed with any other pattern on said photodetector means.

5. A system according to claim 4 in which said phase property comprises the phase of said transmissivity pattern of said mask in said pattern of light relative to said photodetector means.

6. A system for detecting the angle of a light beam within a measurement range of angles comprising detector means and first and second spaced apart masks each having a respective pattern of transmissivity which varies periodically with distance along the respective mask, said first and second masks and said detector means being arranged so that said light beam passes through said first and second masks before falling on said detector means to form a pattern of light on said detector means, said system further comprising analysis means for analyzing a phase property of the output of said detector means to obtain a measure of the angle of said light beam, said detector means comprising an array of photodetector cells at a pitch shorter than half the shortest wavelength of said pattern of light for any angle of said light beam in the measurement range, and the length of the array being longer than twice the longest wavelength of said pattern of light for any angle of said light beam in the measurement range.

7. A system according to claim 6 in which a composite image of said first and second masks is formed on said detector means, and said analysis means processes the output of said detector means to determine the relative phase between the image of said first mask in the composite image and the image of said second mask in the composite image.

8. A system according to claim 7 in which the said images comprise shadows of the masks.

9. A system for detecting the angle of a light beam within a measurement range of angles comprising detector means and a mask having a pattern of transmissivity which varies periodically with distance along said mask, said mask and said detector means being arranged so that said light beam passes through said mask before falling on said detector means to form a pattern of light on said detector means, said system further comprising analysis means to analyze a phase property of the output of said detector means to obtain a measure of the angle of said light beam, said detector means comprising an array of photodetector cells at a pitch shorter than half the shortest wavelength of said pattern of light for any angle of said light beam in the measurement range, and the length of the array being longer than twice the longest wavelength of said pattern of light for any angle of said light beam in the measurement range.

10. A system according to claim 9 in which an image of said mask is formed on said detector means and said analysis means processes the output of said detector means to determine the phase of the image relative to said detector means.

11. A system according to claim 10 in which the image of the mask comprises a shadow thereof.

* * * * *

UNITED STATES PATENT AND TRADEMARK OFFICE
CERTIFICATE OF CORRECTION

PATENT NO. : 5,579,108
DATED      : November 26, 1996
INVENTOR(S): See

It is certified that error appears in the above-identified patent and that said Letters Patent is hereby corrected as shown below:

Column 5, line 48, "where $j=\overline{-1}$" should read --where $j=\sqrt{-1}$--

Column 6, line 9, "$I_f\frac{1}{2}B(f_x-f_r+f_m)expjp$" should read --$I_f = \frac{1}{2} B(f_x - f_r + f_m)expjp$--

Column 8, line 38, "$K_1$" should read --$\underline{k}_1$--

Column 8, line 40, "$K_2$" should read --$\underline{k}_2$--

Column 8, line 42, "$K_1$ and $K_2$" should read --$\underline{k}_1$ and $\underline{k}_2$--

Column 12, line 51, "of the order of about $\overline{2}$" should read --of the order of about $\sqrt{2}$--

Signed and Sealed this

First Day of April, 1997

Attest:

BRUCE LEHMAN

Attesting Officer

Commissioner of Patents and Trademarks